W. C. RYAN AND G. C. RUHMANN.
INSECT CATCHER.
APPLICATION FILED SEPT. 1, 1920.
1,396,345.
Patented Nov. 8, 1921.
2 SHEETS—SHEET 2.
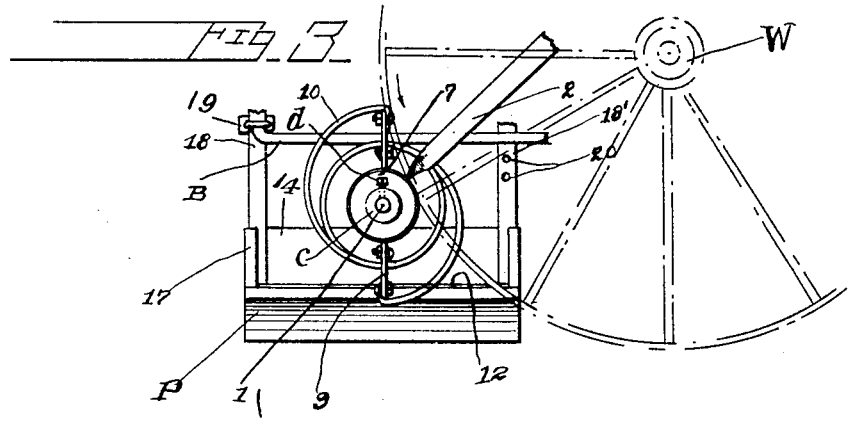
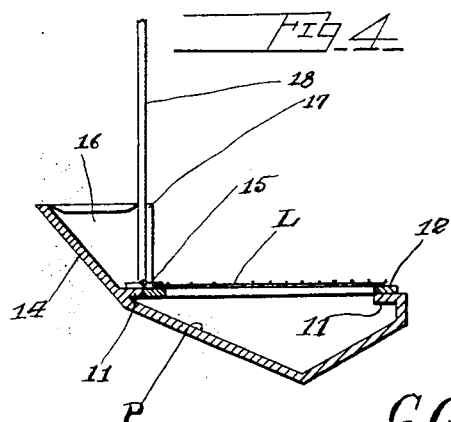
G. C. Ruhmann & W. C. Ryan, INVENTORS
BY Watson E. Coleman, ATTORNEY.

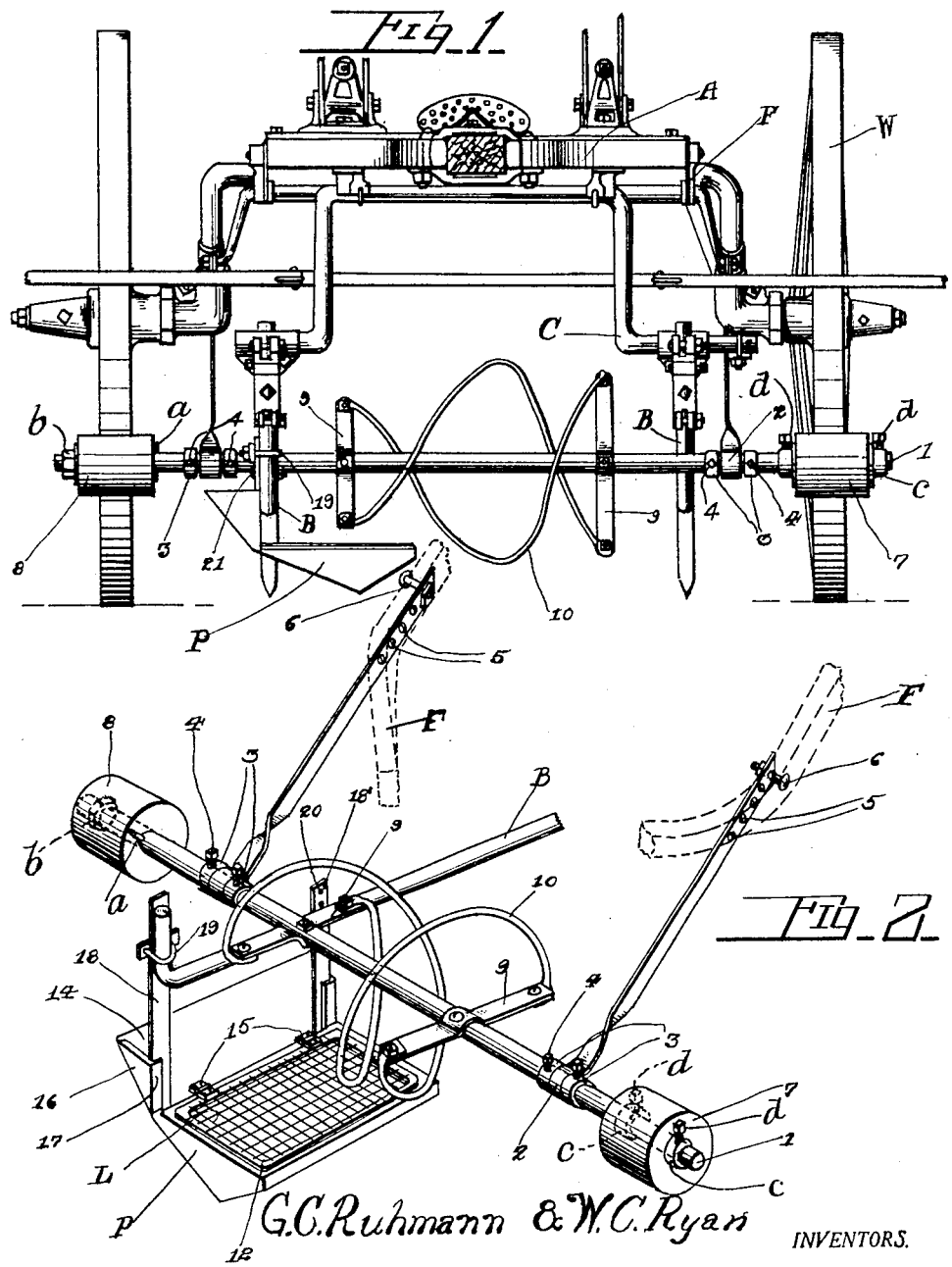

UNITED STATES PATENT OFFICE.

WILLIAM C. RYAN AND GROVER C. RUHMANN, OF KENEDY, TEXAS.

INSECT-CATCHER.

1,396,345.　　　　Specification of Letters Patent.　　Patented Nov. 8, 1921.

Application filed September 1, 1920. Serial No. 407,389.

*To all whom it may concern:*

Be it known that we, WILLIAM C. RYAN and GROVER C. RUHMANN, citizens of the United States, residing at Kenedy, in the county of Karnes and State of Texas, have invented certain new and useful Improvements in Insect-Catchers, of which the following is a specification, reference being had to the accompanying drawings.

This invention relates to certain improvements in insect catchers, and it is an object of the invention to provide a novel and improved device of this general character especially designed and adapted for use in connection with growing plants and which is especially adapted for use to destroy boll weevils, boll worms, sharp shooters, and bugs and insects which infest cotton, potato, tomato and kindred plants.

Another object of the invention is to provide a novel and improved device of this general character adapted to be applied to a cultivator and wherein a rotatable member is employed for agitating the plants, together with means operable from a movable part of the cultivator for imparting the requisite rotation to said agitating member.

An additional object of the invention is to provide a novel and improved device of this general character including a pan or receptacle adapted to travel below the foliage of the plants and containing a life destroying liquid or agency, together with means for agitating the foliage of the plants in such a manner to dislodge the insects or parasites carried thereby and to throw the same within the pan or receptacle.

The invention consists in the details of construction and in the combination and arrangement of the several parts of our improved insect catcher whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawings, wherein:

Figure 1 is a view in front elevation illustrating an insect catcher constructed in accordance with an embodiment of our invention and in applied position.

Fig. 2 is a view in perspective of our improved catcher as herein embodied, the coacting parts of the cultivator being indicated by dotted lines.

Fig. 3 is a fragmentary view in side elevation of the device as herein disclosed, a coacting wheel of the cultivator being indicated by dotted lines.

Fig. 4 is a fragmentary vertical sectional view illustrating certain details of construction as herein included.

As disclosed in the accompanying drawings, F denotes a conventional form of frame for a cultivator of a wheeled type and including the beams B.

Our improved catcher as herein disclosed embodies a shaft 1 disposed transversely of the cultivator C and rotatably supported by the lower end portions of the hangers 2. The shaft 1 is held against longitudinal movement relative to the hangers 2 through the medium of the collars 3 slidably mounted on the shaft 1 and arranged at opposite sides of said hangers 2. The collars 3 are held against movement longitudinally of the shaft 1 by the set-screws 4 or the like. By this means, the hangers 2 may be adjusted lengthwise of the shaft 1 in accordance with the size or width of the cultivator or kindred machine to which our improved device is to be applied.

The upper end portions of the hangers 2 are each provided with a series of openings 5 spaced longitudinally thereof whereby the same may be adjustably connected through the medium of a bolt 6 or the like with the forward end portion of a side member A of the cultivator frame F.

When the hangers 2 are in applied position, the same extend forwardly and downwardly so that the shaft 1 is normally urged by gravity toward the wheels W of the cultivator C. Loosely mounted on one end portion of the shaft 1 is a pulley 7 and fixed to the opposite end portion of the shaft 1 is the pulley 8. The pulleys 7 and 8 normally contact with the wheels W and the pulley 8 serves as a driven member to rotate the shaft 1 while the pulley 7 serves as an idler pulley. The pulley 7 is held in desired position upon the shaft 1 by the collars *c* arranged at opposite sides of the pulley 7 and held in desired position by the set-screws *d* or the like. The pulley 8 is clamped to the shaft 1 through the medium of the pin *a* disposed through the shaft 1 and engaging the inner end of the pulley 8 and by the clamping nut b threaded upon the shaft 1 and engaging the outer end of the pulley 8.

The shaft 1 at its central part is provided with a pair of longitudinally spaced cross arms or members 9, the central portions of which are fixed to the shaft 1 so that said cross arms or members rotate with the shaft 1.

Connecting the extremities of the cross arms or members 9 are the spiral or helical rods 10 encircling the shaft between said arms or members 9, each of said spiral or helical rods having one end portion secured to an extremity of an arm or member 9 and its opposite end portion secured to the extremity of the second arm or member 9 at the opposite side of the shaft.

The pan or receptacle P is positioned, when applied, in close proximity to the ground level and travels below the foliage of the plants. The pan or receptacle P is of requisite dimensions and is preferably formed of galvanized sheet iron. The top face of the pan or receptacle P is open and is defined by the inwardly directed flanges 11 which prevent the life destroying liquid or agency within said pan or receptacle from splashing out while the cultivator C is in transit.

Overlying the upper or open face of the pan or receptacle P is a lid L comprising a frame 12 adapted to engage the flanges 11 while extending over the interior portion of said frame is a wire mesh or fabric of a gage to permit the insects or parasites to be readily collected within the pan or receptacle P.

The outer marginal portion of the pan or receptacle P is defined by an upwardly and outwardly inclined apron or shield 14 to the lower marginal portion of which the lid L is hingedly connected, as at 15. The ends of the apron or shield 14 are provided with the end plates 16 having their inner vertical edges defined by the inwardly disposed flanges 17. Secured to the flanges 17 and to the lower portion of the apron or shield 14 are the upstanding hangers 18 and 18', the forward hanger 18 terminating above the second or rear hanger 18'. The forward hanger 18 is adjustably secured, preferably by the U-clamp 19, to the forward end portion of a beam B, while the upper portion of the hanger 18' is provided with a series of openings 20 spaced longitudinally thereof, whereby the same may also be adjustably engaged with the beam B through the medium of a bolt 21 or the like. The vertical adjustment of the pan or receptacle P is of importance so that said pan or receptacle P may be adjusted in accordance with the height of the plants with which said device is adapted to be employed.

In practice, it has been found that our improved catcher when applied in no way interferes with the functioning of the ground working members carried by the beams B and it has proven of particular advantage in view of the fact that the catcher in itself comprises no springs or cogs as it rests by gravity or its own weight in a position to cause the pulleys 7 and 8 to contact with the wheels W. It has also been fully established in practice that mud or the like collecting on the periphery or tread of the wheels W does not hinder the requisite operation of our improved destroyers as the same will readily pass by the pulleys 7 and 8 due to the fact that our improved device is capable of swinging movement in the same general direction as the direction of travel of the cultivator.

As the machine travels over a row of plants, the spiral or helical rods 10 operate as beaters for agitating the foliage of said plants and serve to carry said foliage over to one side and above the pan or receptacle P and in such a manner whereby the insects or parasites upon the foliage are dislodged therefrom and collected within the pan or receptacle P. A life destroying liquid or agency is placed within the pan so that the insects or parasites received therein will be killed.

From the foregoing description it is thought to be obvious that an insect catcher constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:

1. The combination with a body and supporting wheels therefor; of hangers pivotally engaged with the body, a shaft rotatably supported by the hangers, a pulley fixed to the shaft and normally contacting with one of the supporting wheels whereby the shaft is driven from said supporting wheel, a spiral member encircling the shaft and carried thereby, and a collecting pan carried by the body below the shaft and an end of the spiral member, the hangers being vertically adjustable with respect to the body.

2. The combination with a body and supporting wheels therefor; of hangers pivotally engaged with the body, a shaft rotatably supported by the hangers, a pulley fixed to the shaft and normally contacting with one of the supporting wheels whereby the shaft is driven from said supporting wheel, a spiral member encircling the shaft and carried thereby, a collecting pan carried by the body below the shaft and an end of the spiral member, and a second pulley loosely mounted on the shaft and normally contacting with a second supporting wheel.

3. In combination with a body and a pair of transversely arranged supporting wheels therefor, hangers pivotally engaged with the body, a shaft rotatably supported by the hangers, pulleys mounted upon the opposite end portions of the shaft and normally engaging the wheels, one of said pulleys being fixed to the shaft, cross members having their central portions secured to the shaft at points spaced longitudinally of the shaft, spiral rods connecting the extremities of the members and encircling the shaft, and a collecting pan carried by the body and positioned below the shaft and one end portion of the spiral rods.

In testimony whereof we hereunto affix our signatures.

WILLIAM C. RYAN.
GROVER C. RUHMANN.